(12) United States Patent
Mathew (10) Patent No.: US 11,197,464 B2
(45) Date of Patent: Dec. 14, 2021

(54) SYSTEMS AND METHODS FOR DETECTING UNATTENDED LIFEFORMS IN ENCLOSED SPACES

(71) Applicant: UST Global Inc, Aliso Viejo, CA (US)

(72) Inventor: Kuruvilla Mathew, Aliso Viejo, CA (US)

(73) Assignee: UST Global Inc, Aliso Viejo, CA (US)

( * ) Notice: Subject to any disclaimer, the term of this patent is extended or adjusted under 35 U.S.C. 154(b) by 0 days.

(21) Appl. No.: 16/953,792

(22) Filed: Nov. 20, 2020

(65) Prior Publication Data

US 2021/0153478 A1 May 27, 2021

Related U.S. Application Data

(60) Provisional application No. 62/938,792, filed on Nov. 21, 2019.

(51) Int. Cl.
*A01K 29/00* (2006.01)
*G08B 21/18* (2006.01)

(52) U.S. Cl.
CPC .......... *A01K 29/005* (2013.01); *G08B 21/182* (2013.01)

(58) Field of Classification Search
CPC ............................ A01K 29/005; G08B 21/182
See application file for complete search history.

(56) References Cited

U.S. PATENT DOCUMENTS

| 2004/0004547 | A1* | 1/2004 | Appelt | G08B 21/182 340/573.1 |
| 2010/0282184 | A1* | 11/2010 | Larson | A01K 29/005 119/859 |
| 2014/0306833 | A1* | 10/2014 | Ricci | G06F 21/00 340/901 |
| 2016/0049061 | A1* | 2/2016 | Scarborough | G08B 21/22 340/449 |

(Continued)

OTHER PUBLICATIONS

Geggel, L., "How Long Does It Take a Parked Car to Reach Deadly Hot Temperatures?" Web Page, <URL: https://www.livescience.com/62651-how-hot-cars-get.html>, Retrieved from the Internet Dec. 2, 2020, Published online May 24, 2018 (4 pages).

*Primary Examiner* — James J Yang
(74) *Attorney, Agent, or Firm* — Nixon Peabody LLP; Justin D. Swindells (57) ABSTRACT

A system for determining whether an unattended animal is left in an enclosed space is provided. The system includes a sensor provided within the enclosed space that is configured to generate temperature data and humidity data associated with an interior of the enclosed space and generate physiological data associated with the unattended animal. The system includes a control system that (a) determines, based on the temperature data and the humidity data, whether the interior of the enclosed space is unsafe for the unattended animal, (b) determines, based on the physiological data, whether the unattended animal is within the interior of the enclosed space, and (c) based on the interior of the enclosed (Continued)

space being unsafe for the unattended animal, starts a countdown timer when the physiological data indicates a presence of the unattended animal within the interior of the enclosed space.

20 Claims, 5 Drawing Sheets

(56) References Cited

U.S. PATENT DOCUMENTS

| | | | |
|---|---|---|---|
| 2016/0165852 A1* | 6/2016 | Goldfain | A61B 5/6831 340/573.3 |
| 2016/0200169 A1* | 7/2016 | Tjahjono | B60H 1/00778 701/45 |
| 2019/0217778 A1* | 7/2019 | Swain | E05F 15/71 |
| 2021/0039591 A1* | 2/2021 | Moeller | B60R 25/102 |

\* cited by examiner

SYSTEMS AND METHODS FOR DETECTING UNATTENDED LIFEFORMS IN ENCLOSED SPACES

CROSS-REFERENCE TO RELATED APPLICATIONS

This application claims the benefit of and priority to U.S. Provisional Application No. 62/938,792, filed Nov. 21, 2019, which is hereby incorporated by reference herein in its entirety.

TECHNICAL FIELD

The present disclosure relates to detecting unattended lifeforms in an enclosed space, and more specifically, to systems and methods for determining whether an animal has been left unattended in an enclosed space.

BACKGROUND

Small children, infants, pets, the elderly, etc., can be put at risk when left unattended in a vehicle. Several occurrences of this sort have resulted in loss of life or bystanders damaging the vehicle to rescue the at-risk individual. Furthermore, depending on injuries suffered by the at-risk individual, caretakers can be subject to consequences doled out by the criminal justice system. Although at times, at-risk individuals left unattended in a vehicle come away without harm, having any number of the unlucky ones that are harmed is unacceptable.

A being left in an unattended vehicle can encounter multiple risks due to several factors. Laura Geggel, "How Long Does It Take a Parked Car to Reach Deadly Hot Temperatures?" published in LIVESCIENCE on May 24, 2018, indicates that car dashboards can reach 118 degrees Fahrenheit on a hot day. According to Geggel, any being left in such an environment is introducing humidity into the environment by breathing. And as humidity increases, the being cannot cool down by sweating because sweat will not evaporate as quickly.

Beings left unattended are put at risk in one of many ways. Sometimes a parent goes into a store intending a quick stop at the store while her child is left unattended in the car. Humans can be bad at estimating how much time has passed, and this confusion to how long the child is left in the car can become dangerous for the child. Humans can also get distracted, thus the caregiver can forget that the stop in the store was intended to be a quick one. Sometimes the caregiver forgets the child in the car, maybe because the child was asleep in the back seat. The caregiver may be unaware then that she has left the child in the car. Children can get trapped in a car while playing, for example, a child playing hide and seek can choose the car as a hiding spot and may become trapped in the car. The present disclosure provides systems and methods for determining when a child or another at-risk individual is left unattended in an enclosed space (e.g., a vehicle). The present disclosure also provides systems and methods of alerting interested parties such that misfortune does not befall the child or at-risk individual.

SUMMARY

Contrary to the hypothesis posed by Geggel, the inventor has discovered a surprising result that the humidity actually decreases, not increases, as the temperature inside a closed vehicle rises when a breathing occupant is present inside the vehicle. Measurements taken from actual vehicles show that the humidity decreases, and by monitoring this decrease in humidity, a system can detect the presence of a living occupant inside the vehicle and raise an alarm.

According to some implementations of the present disclosure, a system for determining whether an unattended animal is left in an enclosed space is provided. The system includes a sensor provided within the enclosed space. The sensor is configured to: generate temperature data and humidity data associated with an interior of the enclosed space, and generate physiological data associated with the unattended animal. The system further includes a memory and a control system. The memory stores machine-readable instructions. The control system includes one or more processors configured to execute the machine-readable instructions to: (a) determine, based on the temperature data and the humidity data, whether the interior of the enclosed space is unsafe for the unattended animal, (b) determine, based on the physiological data, whether the unattended animal is within the interior of the enclosed space, and (c) based on the interior of the enclosed space being unsafe for the unattended animal, start a countdown timer when the physiological data indicates a presence of the unattended animal within the interior of the enclosed space.

According to some implementations of the present disclosure, a system for calibrating one or more electronic devices for determining whether unattended animals are in enclosed spaces is provided. The system includes a processor and a non-transitory computer readable medium storing machine readable instructions when execute facilitate performing the steps of: (a) receiving temperature data and humidity data from the one or more electronic devices, each of the one or more electronic devices for determining whether a respective one of the unattended animals is in a respective one of the enclosed spaces, the temperature data and the humidity data associated with interiors of each of the enclosed spaces; (b) training a machine learning algorithm to analyze the temperature data and the humidity data to determine a temperature threshold and a humidity rate threshold, the temperature threshold and the humidity rate threshold being thresholds for a respective one of the one or more electronic devices to generate an alert when the respective one of the unattended animals is in the respective one of the enclosed spaces; and (c) sending the temperature threshold and the humidity rate threshold to the one or more electronic devices.

According to some implementations of the present disclosure, a method for determining whether an unattended animal is left in an enclosed space is provided. The method includes generating temperature data and humidity data associated with an interior of the enclosed space and generating physiological data associated with the unattended animal. The method further includes determining, based on the temperature data and the humidity data, whether the interior of the enclosed space is unsafe for the unattended animal. The method further includes determining, based on the physiological data, whether the unattended animal is within the interior of the enclosed space. The method further includes based on the interior of the enclosed space being unsafe for the unattended animal, starting a countdown timer when the physiological data indicates a presence of the unattended animal within the interior of the enclosed space.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Embodiments of the present disclosure provide a system including sensors and a processor for detecting whether an individual and/or an object is left unattended in an enclosed space (e.g., a vehicle). The system can measure humidity, temperature, sound, motion, and so on, to determine whether the individual is left unattended. An enclosed space can be dangerous to an individual, especially when the enclosed space is a vehicle out in the elements. For example, when a car is left unattended, the car is a closed system with a different level of humidity compared to its environment. On a hot day, heat can evaporate humidity inside the car, and the inventor has discovered that humidity can drop precipitously even when a breathing individual is inside the vehicle (with all windows rolled up). For example, humidity inside the car drop between 5% to 10% within 15 to 30 minutes. For a 1% humidity, air in the car, at this level of humidity when combined with temperature inside the car, is comparable to breathing fire.

The temperature-humidity combination can be deadly, as described regarding to air being breathed in by the unattended individual. Heat index captures the effects of humidity on temperature. Heat index is usually quoted as the "feels like" temperature. The "feels like" temperature captures how hot a biological animal will perceive a certain temperature level when humidity is factored in with actual air temperature. For example, actual air temperature when measured can read 84° F., but when humidity of 70% is factored in, the heat index or "feels-like" temperature is 90° F. That is, 84° F. under 70% humidity feels like 90° F. Effect of temperature on a biological animal can be better captured by heat index because heat index provides a measure of how the biological animal perceives the temperature.

Although the combination of temperature and humidity is discussed, temperature alone (whether quoted as heat index or actual air temperature) can be deadly to the individual because if temperature in an enclosed car becomes too high, an unattended individual can suffer heatstroke due to her body's temperature-regulating mechanism failing in a high temperature environment. Furthermore, high temperatures can lead to cell death and organ failure. An unattended individual in a car is not only in danger from the car being left out on a hot day, but the unattended individual can be in danger on a cold day as well. The unattended individual can suffer from hypothermia, frostbite, etc.

Embodiments of the present disclosure provide systems and methods for determining whether an individual is left unattended in a vehicle so as to avoid aforementioned dangers to the individual. For higher impact and support of legacy systems and older model vehicles, embodiments of the disclosure provide an electronic monitoring device including one or more sensors that can be installed in a vehicle to monitor unattended individuals. The electronic monitoring device can be self-contained, running on an auxiliary power source or including a backup power source separate from the vehicle, to prevent a situation where turning off the vehicle's engine renders the electronic monitoring device useless. Additionally, the electronic monitoring device can be tamper-proof, thus preventing a caretaker, a nanny, or some other person from temporarily turning off the electronic monitoring device.

Figure 1:
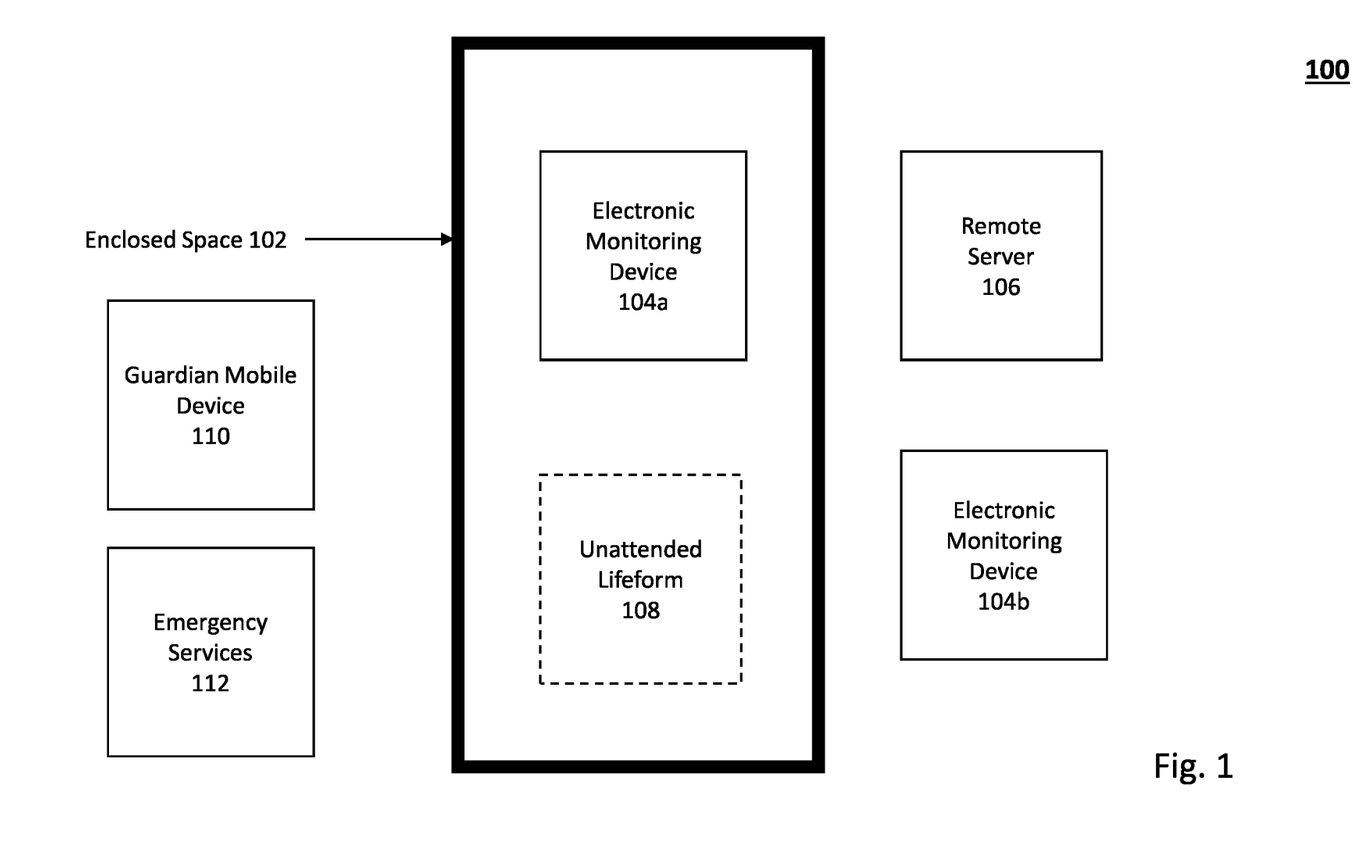
FIG. 1 illustrates a block diagram of an environment where an unattended lifeform can be detected according to some implementations of the present disclosure.

FIG. 1 illustrates a block diagram of an environment 100 where an unattended lifeform 108 (e.g., an unattended animal) can be detected in an enclosed space 102, according to some implementations of the present disclosure. The unattended lifeform 108 is dotted to indicate that in some cases, the unattended lifeform 108 is not present in the enclosed space 102. The unattended lifeform 108 can be a child, an infant, an elderly person, a person with a disability or functional impairment, a pet, etc. The enclosed space 102 can be a vehicle, a greenhouse, a storage unit, a closet, etc. forming an enclosure that is generally sealed or closed from the outside environment. For example, a vehicle with all the windows rolled up or even one window cracked slightly open is not a completely hermetically sealed environment, so the term "enclosed" is not intended to convey a completely hermetically sealed environment.

The unattended lifeform 108 can be detected using one or more electronic monitoring devices (e.g., electronic monitoring devices 104a, 104b). The electronic monitoring device 104a is provided within the enclosed space 102, and the electronic monitoring device 104b is provided outside the enclosed space 102. Although shown as two devices, in some embodiments, only the electronic monitoring device 104a is provided for sensing whether the unattended lifeform 108 is present within the enclosed space 102.

In some embodiments, the electronic monitoring device 104a is provided for sensing whether the unattended lifeform 108 is present within the enclosed space 102, and the electronic monitoring device 104b includes additional sensors for augmenting sensing of the electronic monitoring device 104a. For example, the electronic monitoring device 104a includes a motion sensor to determine whether the unattended lifeform 108 is moving within the enclosed space 102. The motion sensor can be an infrared sensor or other imaging device. The electronic monitoring device 104b can include a camera pointed at the enclosed space 102 for capturing movement within the enclosed space 102. In some implementations, the electronic monitoring device 104a and the electronic monitoring device 104b are part of a mesh sensor network such that data can be captured and recorded by the electronic monitoring devices 104a, 104b simultaneously. Simultaneous capturing and recording of data minimizes temporal noise effects in the data between the electronic monitoring devices 104a and 104b so that instantaneous measurements from each of the electronic monitoring devices 104a and 104b have a same timestamp.

Each of the electronic monitoring devices 104a, 104b can include one or more sensors, one or more memory devices, and one or more processors for generating data associated with the environment 100 and the unattended lifeform 108. The electronic monitoring device 104a can be different from the electronic monitoring device 104b, having different sensor, processor, and/or memory configurations. For example, the electronic monitoring device 104a can include a humidity sensor when the electronic monitoring device 104b does not.

In some embodiments, the electronic monitoring devices 104a, 104b can communicate with a remote server 106. The remote server 106 can be a cloud server with access to computer programs for receiving sensing data from the electronic devices 104a, 104b and determining whether the unattended lifeform 108 is present in the enclosed space 102. In some embodiments, the electronic monitoring device 104b sends measured data to the electronic monitoring device 104a, and then the electronic monitoring device 104a sends measured data collected from both the electronic monitoring device 104a and 104b to the remote server 106.

In some embodiments, the remote server 106 or the electronic monitoring device 104a can send a distress signal or a warning or alarm signal such as a push notification to a guardian mobile device 110. The guardian mobile device 110 is a mobile device of a caretaker, a guardian, a parent, etc. Example mobile devices include a smart phone, a cellphone, a tablet, a smartwatch, etc. The distress signal or warning signal can alert the guardian mobile device 110 that the unattended lifeform 108 is present in the enclosed space. The guardian mobile device 110 is a computing device with a processor, memory, and network interface that can receive the distress signal or warning signal to alert the guardian of the unattended lifeform 108 of FIG. 1 via text message, email, push notification, phone call, or the like.

In some embodiments, the remote server 106 or the electronic monitoring device 104a can alert emergency services 112 if the guardian mobile device 110 does not respond within a certain timeframe. The emergency services 112 include 911 dispatchers, hospitals, police, fire departments, businesses proximate to the enclosed space, etc.

Figure 2:
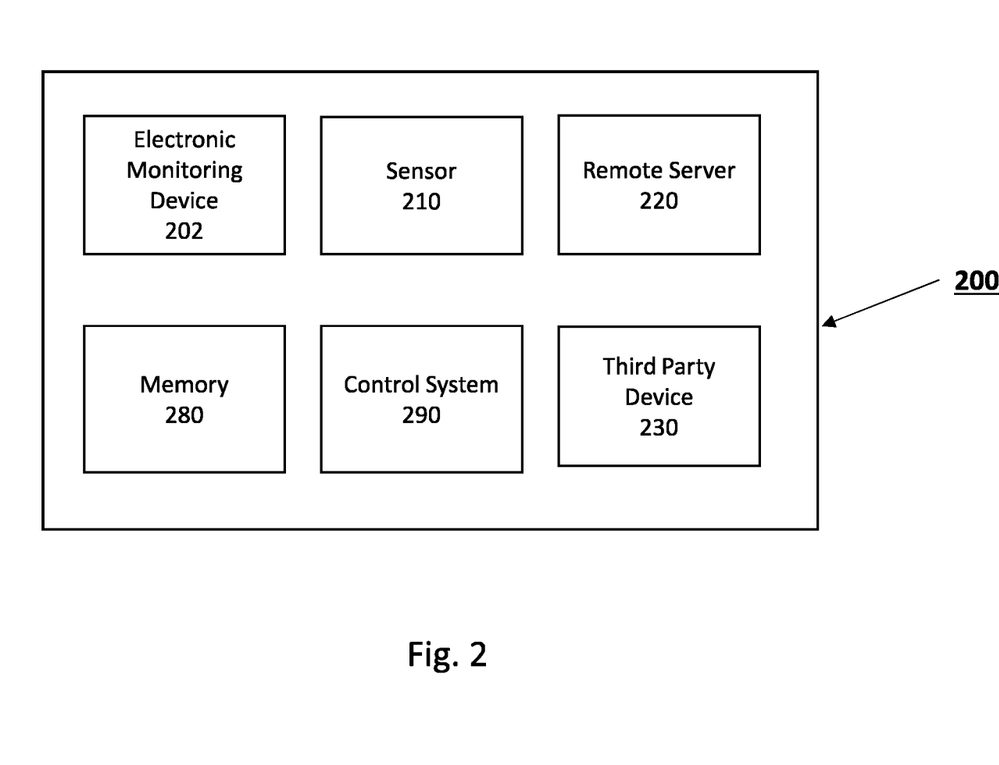
FIG. 2 illustrates a block diagram of a system for detecting unattended lifeforms in an enclosed space according to some implementations of the present disclosure.

Referring to FIG. 2, a block diagram of a system 200 for detecting unattended lifeforms in an enclosed space according to some implementations of the present disclosure is provided. To simplify discussion, the singular form will be used for components identified in FIG. 2 when appropriate, but the use of the singular does not limit the discussion to only one of each such component. The system 200 includes an electronic monitoring device 202. The electronic monitoring device 202 can represent (1) a combination of the electronic monitoring device 104a and the electronic monitoring device 104b, or (2) the electronic monitoring device 104a. The system 200 further includes a sensor 210. The sensor 210 can be one or more sensors located in the electronic monitoring device 202, one or more sensors located in the enclosed space 102, one or more sensors located outside of the enclosed space 102, or any combination thereof.

The sensor 210 can include one or more microphones, one or more Global Positioning System (GPS) receivers, one or more infrared cameras, one or more speakers, one or more radar sensors, one or more clocks, one or more motion detectors, one or more lux meters, one or more gas sensors, or any combination thereof. The sensor 210 is configured to generate data associated with the enclosed space 102. For example, the sensor 210 can generate temperature data and humidity data indicating temperature and humidity, respectively, within the enclosed space 102. The sensor 210 can also generate physiological data associated with the unattended lifeform 108. The physiological data can include, for example, movement of the unattended lifeform 108, sound coming from the unattended lifeform 108, or any combination thereof.

The system 200 can further include a remote server 220. The remote server 220 is similar to or the same as the remote server 106. The remote server 220 is configured to receive data generated by the sensor 210. The remote server 220 can receive the generated data from the electronic monitoring device 202. The remote server 220 is configured to analyze the generated data to determine whether the unattended lifeform 108 is present in the enclosed space 102. In some embodiments, the electronic monitoring device 202 sends the generated data to the remote server 220 after the electronic monitoring device 202 determines that the unattended lifeform 108 is present in the enclosed space.

In some embodiments, the electronic monitoring device 202 sends the generated data to the remote server 220 using General Packet Radio Service (GPRS). With GPRS, the electronic monitoring device 202 can perform direct cell communication with the remote server 220 and can support two-way communication. To manage power consumption in the electronic monitoring device 202, packets can be sent to the remote server 220 at intervals. In an example, when the electronic monitoring device 202 is activated, packets are sent to the remote server 220, otherwise the electronic monitoring device 202 lies dormant and does not communicate with the remote server 220.

In some embodiments, the remote server 220 is configured to send data to the electronic monitoring device 202. For example, the remote server 220 can send calibration settings and algorithms to the electronic monitoring device 202. An example of an algorithm that can be sent includes a method for the electronic monitoring device 202 to combine data generated by the sensor 210.

The system 200 can further include a third party device 230. The third party device 230 is similar to or the same as the guardian mobile device 110 or the emergency services 112. The electronic monitoring device 202 and/or the remote server 220 is configured to alert the third party device 230 when the unattended lifeform 108 is present in the enclosed space. In some implementations, the third party device 230 includes a smart speaker, a smart television, etc.

The system 200 further includes a memory 280. The memory 280 can include one or more physically separate memory devices, such that one or more memory devices can be coupled to and/or built into the electronic monitoring device 202, a control system 290, the remote server 220 and/or one or more external devices (e.g., mobile phones, computers, servers, cloud based devices, etc.) wirelessly coupled and/or wired to the system 200. The memory 280 can be a non-transitory computer readable storage medium on which is stored machine-readable instructions that can be executed by the control system 290 and/or one or more other components of the system 200. The memory 280 is also able to store the data generated by the sensor 210. In some implementations, the memory 280 includes non-volatile memory, static random access memory (RAM), EEPROM memory, flash memory, database storage, or any combination thereof.

Like the memory 280, the control system 290 can be coupled to the electronic monitoring device 202 and/or the remote server 220. The control system 290 is coupled to the memory 280 such that the control system 290 is configured to execute the machine-readable instructions stored in the memory 280. The control system 290 can include one or more processors and/or one or more controllers. In some implementations, the control system 290 is a dedicated electronic circuit. In some implementations, the control system 290 is an application-specific integrated circuit. In some implementations, the control system 290 includes discrete electronic components.

The control system 290 is able to receive input(s) (e.g., signals, generated data, instructions, etc.) from any of the other elements of the system 200 (e.g., the sensors, etc.). The control system 290 can perform computations on the received inputs. For example, the control system 290 can receive temperature and humidity data from a temperature sensor and a moisture sensor of the sensor 210. The control system 290 can determine heat index data from the received temperature and humidity data. The control system 290 can provide output signal(s) to cause one or more actions to occur in the system 200 (e.g., to cause the electronic monitoring device 202 to send a distress or warning signal to the remote server 220 and/or the third party device 230, etc.).

Figure 3:
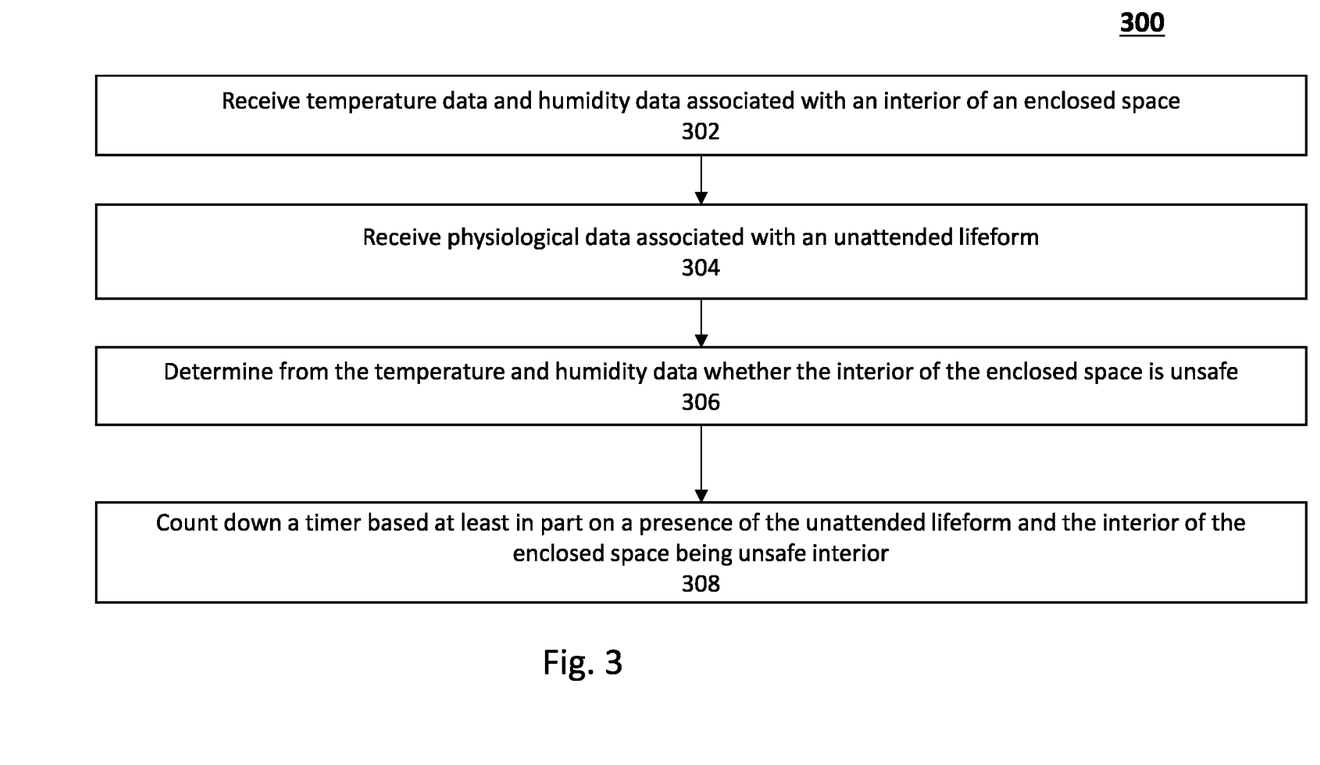
FIG. 3 is a flow diagram illustrating a process for detecting unattended lifeforms according to some implementations of the present disclosure.

FIG. 3 is a flow diagram illustrating a process 300 for detecting unattended lifeforms (e.g., the unattended lifeform 108) in an enclosed space according to some implementations of the present disclosure. At step 302, the control system 290 (and/or the electronic monitoring device 202) receives temperature data and humidity data associated with an interior of the enclosed space. The control system 290 receives the temperature data and the humidity data generated by the sensor 210. The temperature data includes temperature of the air in the interior of the enclosed space. The temperature data can also include temperature of the air outside of the enclosed space. The humidity data includes humidity within the interior of the enclosed space.

In some implementations, the control system 290 can receive other data pertaining to the enclosed space 102 that is generated by the sensor 210. Examples of the other data include light data including luminous flux inside and/or outside of the enclosed space, a time of day, etc. Luminous flux can be determined using a photoresistor included in the sensor 210.

At step 304, the control system 290 (and/or the electronic monitoring device 202) receives physiological data associated with the unattended lifeform 108. The control system 290 receives the physiological data generated by the sensor 210. The physiological data can include motion data, sound data, or any combination thereof. A microphone can be used to capture sound data, a motion detector or imaging system can be used to capture the motion data.

At step 306, the control system 290 determines from the received temperature and humidity data whether the interior of the enclosed space 102 is unsafe for the unattended lifeform 108. In some implementations, the temperature of the interior of the enclosed space 102 is compared against a temperature threshold. If the temperature of the interior of the enclosed space 102 is above a temperature threshold, then the interior of the enclosed space 102 is determined to be unsafe. In an example, the temperature threshold can be set at 90° F., 105° F., 115° F., 130° F., etc.

In an example, different temperature bands can be used based on time exposure. For example, Occupational Safety and Health Administration (OSHA) and/or Centers for Disease Control and Prevention (CDC) temperature guidelines can be used. Individuals under prolonged exposure to temperatures between 80° F. and 90° F. or individuals performing physical activity under temperature conditions within the temperature band of 80° F. and 90° F. can suffer from fatigue. Individuals under prolonged exposure and/or performing physical activity within the temperature band of 90° F. and 105° F. can suffer heatstroke, heat cramps, or heat exhaustion. Prolonged exposure to temperatures within the temperature band encompassing 105° F. to 130° F. can result in sunstroke, heat cramps, or heat exhaustion. Heatstroke or sunstroke can be imminent when temperature is above 130° F. Although described generally in terms of temperature, it is understood that heat index values can be compared against the different temperature bands and/or temperature thresholds.

In some implementations, at step 306, safety of the enclosed space can be determined using humidity data. For example, the control system 290 determines from the humidity data whether a rate of change of humidity in the enclosed space is below a humidity rate threshold. The control system 290 calculates the rate of change of humidity from the humidity data received at step 304. The humidity data can include humidity in the enclosed space at different timestamps. On a hot day, humidity inside the enclosed space (e.g., a vehicle) can drop about 10% within 40 minutes. The control system 290 can determine the drop in humidity within a certain time period to determine whether the rate of change of humidity satisfies the humidity rate threshold. Example values for the humidity rate threshold include a 7% humidity drop within one hour, a 10% humidity drop within 40 minutes, etc. A surprising result is that the humidity will actually decrease in a measurable way fairly rapidly, and this humidity drop (or rate of decrease) can used as a condition for raising an alarm, alone or in combination with a temperature change satisfying a criterion or exceeding a threshold.

In some implementations, the control system 290 determines from the humidity data whether humidity in the enclosed space is below a humidity threshold. The control system 290 can determine that humidity being too low in the enclosed space is dangerous to the unattended lifeform. In some implementations, the humidity threshold of about 25% humidity is used to determine that the enclosed space 102 is unsafe.

In some implementations, at step 306, safety of the enclosed space can be determined using a deviation between actual temperature and heat index. For example, if heat index within the enclosed space is 110° F. and actual temperature within the enclosed space is 88° F., then the 22° F. separation between the heat index and the actual temperature can indicate that the enclosed space is unsafe. A separation threshold can be used to determine safety of the enclosed space such that when the separation between the heat index and the actual temperature exceeds the separation threshold, then the enclosed space is determined as being unsafe. Example values for the separation threshold include 20° F., 30° F., 40° F., etc. In some implementations, a rate of change of the separation between the heat index and the actual temperature and/or whether the separation is increasing or decreasing is used to determine safety of the enclosed space.

Although described separately, the different methods of determining whether the enclosed space is unsafe can be combined. For example, the separation threshold can be combined with the temperature threshold such that when the separation threshold is used as a secondary consideration when determining whether the enclosed space is unsafe. That is, if the temperature threshold is met, then the separation between the heat index and the actual temperature is compared against the separation threshold to determine whether the enclosed space is unsafe. In some implementations, the separation threshold is combined with the humidity rate threshold to determine whether the enclosed space is unsafe. For example, if the humidity rate threshold is exceeded, then the enclosed space can be determined to be unsafe once the separation threshold is also met. In some implementations, if the humidity rate threshold is exceeded and the separation is determined to be increasing, then the enclosed space is determined to be unsafe.

In some implementations, other considerations can be combined with the temperature data and the humidity data to inform on whether the enclosed space is unsafe for the unattended lifeform. For example, the sensor 210 can include one or more lux meters that provide light data including luminous flux to determine an amount of light within the enclosed space. The control system 290 can combine luminous flux with a time of day to determine whether the enclosed space is unsafe. If luminous flux satisfies a lux threshold during the afternoon, then the control system 290 can determine that a being would be in greater danger. For example, if at least one of the lux meters in the sensor 210 registers lux values above 10,000 lux, then the control system 290 can determine that the enclosed space is under daylight. If the at least one of the lux meters registers lux values above 25,000 lux, then the control system 290 can determine that the enclosed space must be exposed to direct sunlight. That is, at least one of the lux meters within the enclosed space is exposed to direct sunlight. Lux thresholds can be used to determine whether to start the timer earlier. Earlier can be a minute earlier, two minutes earlier, five minutes earlier, etc.

At step 310, the control system 290 starts a timer based at least in part on a presence of the unattended lifeform being detected in the enclosed space 102 and the interior of the enclosed space 102 being unsafe. Motion data and/or sound data can be used to determine whether the unattended lifeform is in the enclosed space 102. For example, the sensor 210 can include a camera, a sonar sensor, a radar sensor, or any combination thereof, that detects motion within the enclosed space 102. Detected motion within the enclosed space 102 is indicative of the unattended lifeform being in the enclosed space. However, the present disclosure can also detect a lifeform that is not moving, such as a child or pet that is napping, thanks to the humidity sensing strategies discussed herein. Conventional systems that rely on motion will not detect a still, sleeping lifeform.

In some implementations, the sound data can be analyzed to determine whether the unattended lifeform is in the enclosed space 102. For example, the control system 290 can analyze sounds within the enclosed space 102, and if the sounds in the enclosed space 102 satisfy a decibel threshold, then the control system 290 determines that the unattended lifeform is in the enclosed space 102. In some implementations, the decibel threshold is set at 50 decibels, 60 decibels, 70 decibels, etc. The decibel range can be set to capture loud human voices which are greater than 76 decibels. The decibel threshold can be set to capture heavy breathing which can be, for example, sounds greater than 15 decibels. The sound data can be obtained from one or more microphones included in the sensor 210. Again, advantageously, the present disclosure can detect any lifeform whether it moves or makes a sound. A sleeping child may not produce movements or sounds especially after losing consciousness, so conventional systems that rely on motion and/or sound will not detect such an event. The present disclosure can detect any lifeform present within an enclosed space regardless of whether the lifeform makes any sounds or movements. These additional sensors can be used to augment and enrich the criteria used by the system to determine whether to raise an alarm.

In some implementations, the sound data can be analyzed to determine whether the unattended lifeform in the enclosed space 102 is distressed. For example, the sounds in the enclosed space 102 are analyzed for screaming patterns, yelling patterns, crying patterns, breathing patterns, talking patterns, etc. The control system 290 can determine an attack, decay, sustain, and release (ADSR) profile for sounds in the enclosed space 102. For example, an ADSR profile for crying is different from screaming, as such, in some implementations, the control system 290 can start the timer based on the ADSR profile indicating that the unattended lifeform 108 is crying. The ADSR profile describes a sound envelope over time from a beginning to an end. The sound envelope can be separated into an attack duration, a decay duration, a sustain duration, and a release duration. Higher amplitudes of the envelope during the attack and the decay durations can be used to differentiate between crying and screaming vs. talking. For example, the amplitudes of the envelope during the attack and decay durations for crying and screaming will be greater than the amplitudes of the attack and decay durations for talking. The sustain duration for crying and screaming will be greater than the sustain duration for talking. In some implementations, the sustain duration is compared against a threshold (e.g., five seconds, six seconds, ten seconds, etc.), and when greater than the threshold, the unattended lifeform is determined to be distressed. In some implementations, the sounds in the enclosed space 102 are analyzed for pitch, and based on the pitch indicating crying or distress, the control system 290 can start the timer.

In some implementations, the control system 290 can use a gas sensor included in the sensor 210 to determine whether toxic fumes are released within the enclosed space containing the unattended lifeform. For example, cars have leather seats which can give up toxic fumes when in a high temperature environment. Data from the gas sensor indicating presence of toxic fumes or lower oxygen to carbon dioxide ratio can be used to further determine whether to start the timer.

At step 308, once the control system 290 starts the timer, the electronic monitoring device 202 enters a high sampling region. For example, prior to the timer being started, the electronic monitoring device 202 may collect data (e.g., humidity data, temperature data, luminosity data, etc.) every minute, every two minutes, every thirty seconds, etc. After the timer being started, the electronic monitoring device 202 may collect data with a higher sampling rate, for example, every five seconds, every ten seconds, every fifteen seconds, etc. The high sampling region can last for about forty-five seconds, thus, if the sampling rate during the high sampling region is every fifteen seconds, then four measurements can be obtained during the high sampling region.

In some implementations, data obtained during the high sampling region is compared against data captured prior to the high sampling region. That is, during the high sampling region, the control system 290 verifies that the unattended lifeform is detected in the enclosed space 102. For example, the motion and/or sound data obtained during the high sampling region is analyzed to determine that the unattended lifeform is detected. The control system 290 also verifies that the interior of the enclosed space 102 is unsafe for the unattended lifeform. For example, temperature and/or humidity data is used to determine that the enclosed space 102 is unsafe. Data obtained during the high sampling region can be averaged to reduce noise in the data. Once validated, the control system 290 can send an alert to the third party device 230 (e.g., a caregiver's device, an emergency worker's device, etc.). In some implementations, if the control system 290 determines, during the high sampling region, that the unattended lifeform is not present in the enclosed space 102, then the control system 290 does not send out an alert.

Temperature and humidity thresholds can be determined using machine learning. The remote server 220 can interface with multiple electronic monitoring devices (e.g., the electronic monitoring device 202) to obtain temperature data and humidity data from each of the multiple electronic monitoring devices. For example, in a geographical region where multiple neighbors are using the multiple electronic monitoring devices, data from the different electronic monitoring devices can be used with a machine learning model to determine temperature and humidity thresholds. The remote server 220 can train a machine learning algorithm to analyze received temperature and/or humidity data to determine a temperature threshold, a humidity rate threshold, a temperature-heat index separation threshold, or any combination thereof.

In some implementations, the remote server 220 can segment the multiple electronic monitoring devices by geographical regions such that multiple machine learning algorithms are trained to obtain multiple temperature thresholds and multiple humidity rate thresholds. Respective temperature thresholds and humidity rate thresholds being provided to electronic monitoring devices based on their respective geographical region. For example, temperature conditions in Chicago during the summer are different from temperature conditions in San Francisco during the summer. Elevation can also be a factor to be considered. As such, using multiple machine learning algorithms for different geographical regions can take into account other latent factors that may not be captured from comparing purely temperature data from one geographical region to another.

Figure 4:
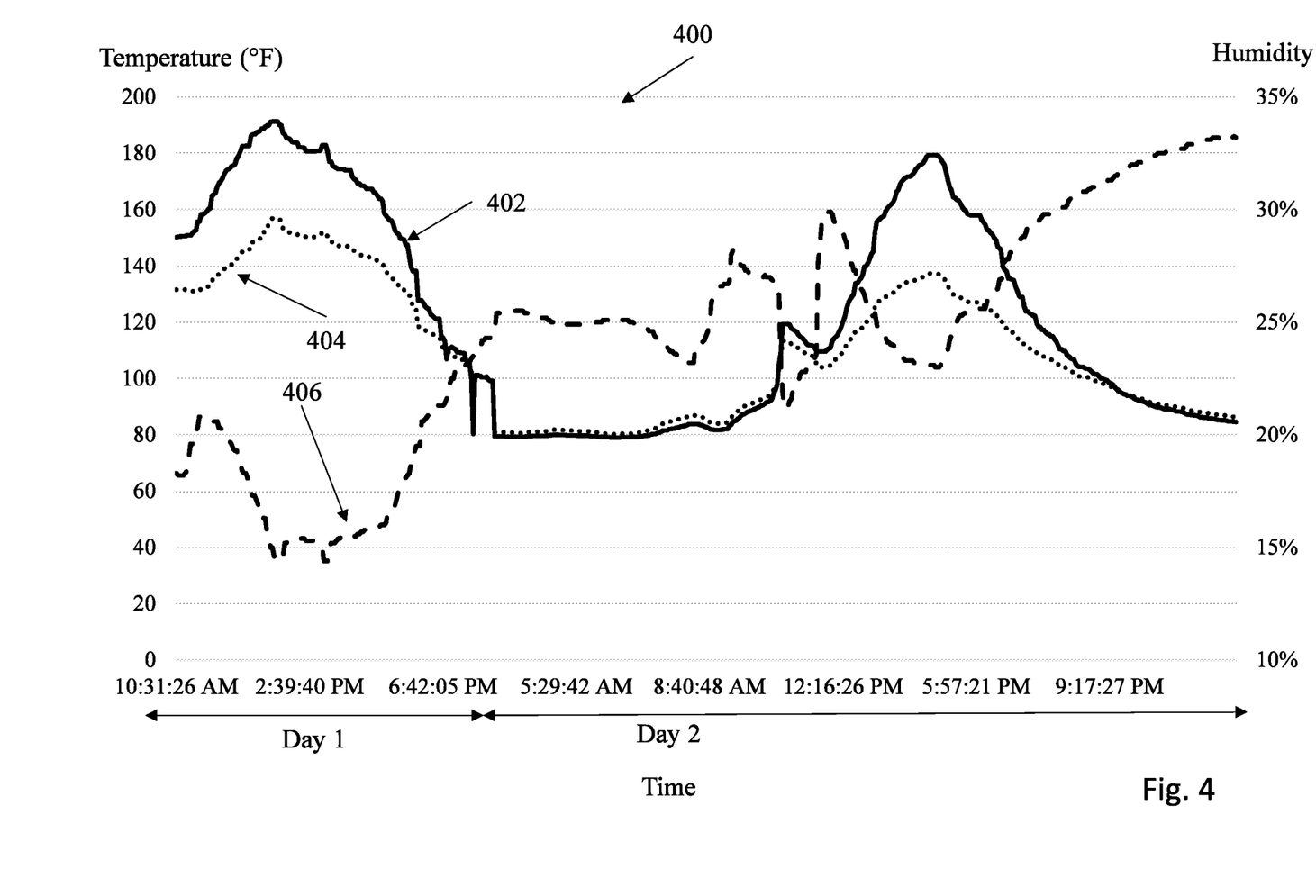
FIG. 4 is an example graph showing temperature, heat index, and humidity inside a car.

FIG. 4 is an example graph 400 showing temperature, heat index, and humidity inside an enclosed car over a span of about two days. Day 1 data was collected from about 10:30 am to about 8 pm, and Day 2 data was collected from about 4 am to about 11:59 pm. The graph 400 shows how heat index 402, temperature 404, and humidity 406 varies in the enclosed car over the two days. The heat index 402 separates from the temperature 404 during Day 1, illustrating that the "feels like" temperature in an enclosed space can be drastically different from measured temperature. It can also be observed that from around 2:40 pm to about 6:40 pm, temperature 404 and heat index 402 decrease, and humidity 406 increases. As humidity increases, separation between the temperature 404 and the heat index 402 decreases. On Day 2, from about 4 am to about 10 am, temperature 404 and heat index 402 track each other. On Day 2, from about 12:16 pm to about 5 pm, humidity 406 decreases as the separation between the temperature 404 and the heat index 402 increases.

Figure 5:
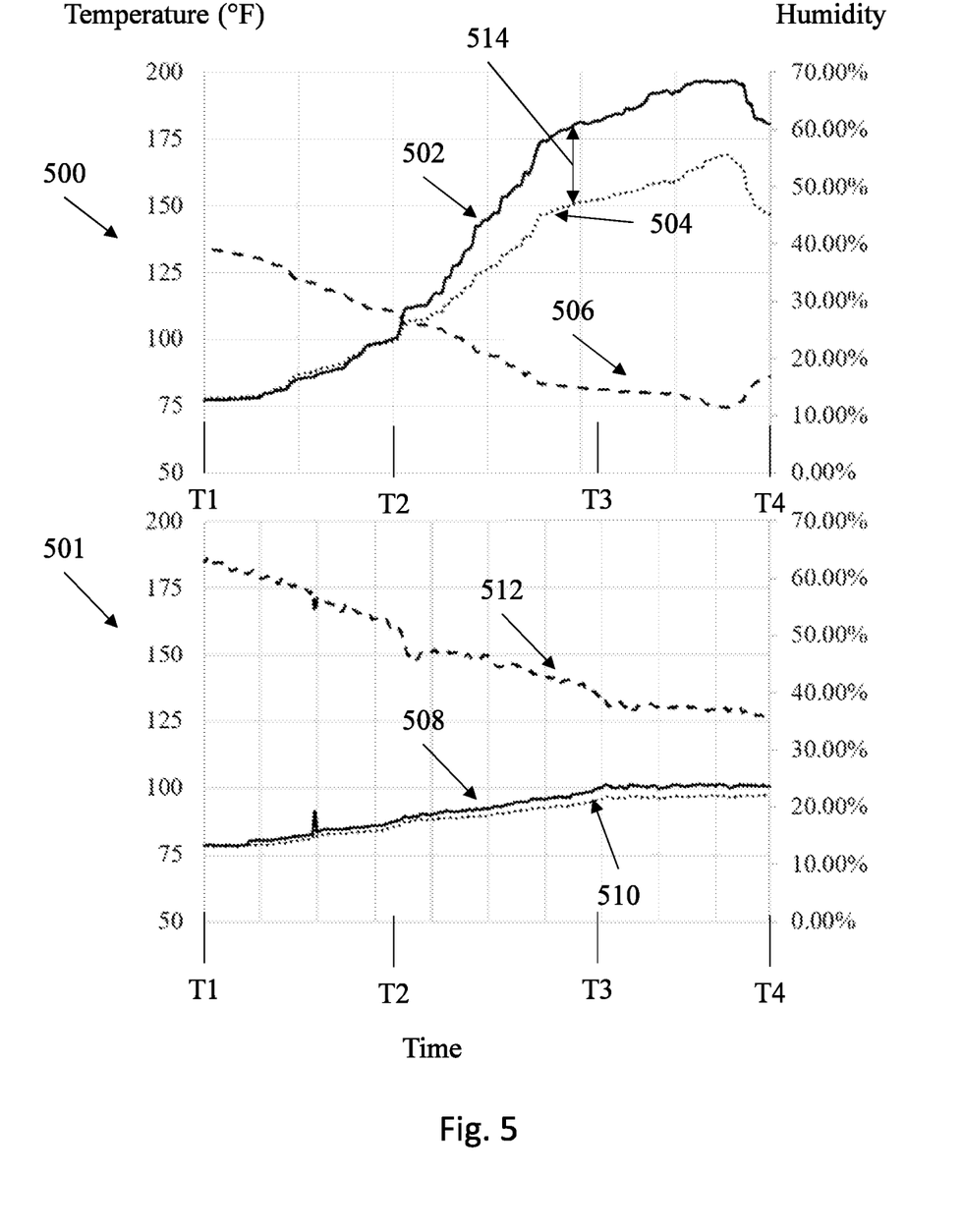
FIG. 5 provides graphs showing measurement results inside and outside a car.

FIG. 5 shows results from an experiment based on the environment 100 of FIG. 1. The experiment setup involved parking a Toyota Corolla (e.g., the enclosed space 102) on a street in Mission Bay, Calif. The Corolla had a first sensor (e.g., the electronic monitoring device 104*a* of FIG. 1) placed between the passenger's seat and the driver's seat. Another good location for the first sensor can be within the compartment for the dome light in the ceiling of the car or the courtesy light that may be present in some vehicles between the B and C pillars above the rear door. The first sensor was not exposed to direct sunlight. A second sensor (e.g., the electronic monitoring device 104*b*) was placed outside the Corolla. The first sensor and the second sensor are part of a mesh network. In the mesh network, the second sensor is connected to a cloud service (e.g., the remote server 106), and the first sensor is connected to the second sensor. The first sensor relays data to the second sensor which then provides data from both the first and the second sensors to the cloud service.

The first sensor measured humidity, temperature, and heat index inside the Corolla, and the second sensor measured humidity, temperature, and heat index of the environment outside the Corolla. The second sensor was within 20 ft of the Corolla. The first and second sensors included DHT22 sensors manufactured by Adafruit Industries LLC for measuring temperature and humidity. The first sensor included a passive infrared sensor for detecting a lifeform within the Corolla. The passive infrared sensor was a Panasonic inductive proximity sensor 0.13" (3.3 mm) IP68 module. A passive infrared sensor can detect lifeforms without the use of motion or sound. Heat flux can be measured using the passive infrared sensor so that even when an unattended lifeform (e.g., a child in the car) is not moving, the unattended lifeform can be detected. Due to ethical reasons, no pet, child, or animal was placed inside the Corolla.

FIG. 5 shows graph 500, providing results within the Corolla, and graph 501, providing results of the environment outside the Corolla. Results shown in both the graphs 500 and 501 are from about 8:20 am (time T1) to about 12:50 pm (time T4) during a single day. The graph 500 includes inside temperature 504, inside heat index 502, and inside humidity 506. A separation 514 between the inside temperature 504 and the inside heat index 502 is marked. The graph 501 includes outside temperature 510, outside heat index 508, and outside humidity 512.

At time T1, the inside temperature 504, the inside heat index 502, the outside temperature 510, and the outside heat index 508 are at about 75° F. At time T1, the inside humidity is about 40%, and the outside humidity is about 65%. Over times T1 to T4, the outside temperature and the outside heat index rise from about 75° F. to about 100° F., and the humidity falls from about 65% to about 35%. In contrast, over times T1 to T4, the inside temperature 504 rises from about 75° F. to about 170° F., the inside heat index rises from about 75° F. to about 190° F., and the inside humidity falls from about 40% to about 10%.

The graphs 500 and 501 illustrate that although conditions outside the Corolla may not seem unsafe, conditions inside the Corolla. At time T2, the inside temperature 504 and the inside heat index 502 are both about 100° F. while the outside temperature 510 is about 88° F. Between times T2 and T3, even though the outside temperature 510 increased only about 10° F., the inside temperature 504 increased about 50° F., and the inside heat index 502 increased about 80° F. The separation 514 is shown to increase over the period T2 to T3 as the inside humidity 506 decreases over the same period.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A system for determining whether an unattended animal is left in an enclosed space, the system comprising:
   a sensor provided within the enclosed space, the sensor configured to:
      generate temperature data and humidity data associated with an interior of the enclosed space, and
      generate physiological data associated with the unattended animal;
   a memory storing machine-readable instructions; and
   a control system including one or more processors configured to execute the machine-readable instructions to:
      determine, based on the temperature data and the humidity data indicating a decrease in humidity or a rate of decrease of humidity, whether the interior of the enclosed space is unsafe for the unattended animal, wherein the decrease in humidity or the rate of decrease of humidity indicates that a presence of the unattended animal in the interior of the enclosed space,
      determine, based on the physiological data and the humidity data, whether the unattended animal is within the interior of the enclosed space, and
      based on the interior of the enclosed space being unsafe for the unattended animal, start a countdown timer when the physiological data indicates a presence of the unattended animal within the interior of the enclosed space.

2. The system of claim 1, wherein the physiological data includes motion data, sound data, or a combination thereof, the motion data and the sound data associated with the unattended animal.

3. The system of claim 2, wherein the control system is further configured to execute the machine-readable instructions to analyze the sound data to determine an attack, decay, sustain, and release (ADSR) profile and start the countdown timer based on the ADSR profile indicating that the unattended animal is stressed.

4. The system of claim 1, further comprising:
   a network interface configured to send the temperature data, the humidity data, the physiological data, or any combination thereof, to a remote server when the countdown timer is started.

5. The system of claim 1, wherein the determine whether the interior of the enclosed space is unsafe for the unattended animal includes:
   determining, based on the humidity data, whether humidity inside the interior is below a humidity threshold; and
   determining that the interior of the enclosed space is unsafe based on the humidity inside the interior being below the humidity threshold.

6. The system of claim 1, wherein the sensor is further configured to:
   generate light data, the light data including luminous flux inside or outside of the enclosed space,
   wherein the countdown timer is further started based on the luminous flux.

7. The system of claim 6, wherein the countdown timer is further started based on the time of day.

8. The system of claim 1, wherein the sensor includes one or more microphones, one or more Global Positioning System (GPS) receivers, one or more infrared cameras, one or more speakers, one or more radar sensors, one or more clocks, one or more lux meters, or any combination thereof.

9. The system of claim 1, wherein the control system is further configured to execute the machine-readable instructions to:
   increasing a data sampling rate for the sensor from a first sampling rate to a second sampling rate, the first sampling rate being below the second sampling rate based on the countdown timer being started.

10. The system of claim 9, wherein the one or more processors are further configured to execute the machine-readable instructions to verify that the unattended animal is within the interior of the enclosed space and that the interior of the enclosed space is unsafe for the unattended animal using the temperature data and the physiological data generated by the sensor using the second sampling rate.

11. The system of claim 10, wherein the one or more processors are further configured to execute the machine-readable instructions to cause a message to be sent to a caregiver of the unattended animal based on verifying that the unattended animal is within the interior of the enclosed space.

12. The system of claim 1, wherein the countdown timer is a one-minute timer.

13. The system of claim 1, wherein the determine whether the interior of the enclosed space is unsafe for the unattended animal includes:
   determining, based on the temperature data, whether temperature inside the interior is above a temperature threshold; and
   determining that the interior of the enclosed space is unsafe based on the temperature inside the interior being above the temperature threshold.

14. The system of claim 1, wherein the determine whether the interior of the enclosed space is unsafe for the unattended animal includes:
   determining, based on the temperature data, whether heat index inside the interior is below a temperature threshold; and
   determining that the interior of the enclosed space is unsafe based on the heat index inside the interior being below the temperature threshold.

15. The system of claim 1, wherein the determine whether the interior of the enclosed space is unsafe for the unattended animal includes:
   determining, based on the temperature data, whether separation between temperature inside the interior and heat index inside the interior is below a separation threshold; and
   determining that the interior of the enclosed space is unsafe based on the separation being above the separation threshold.

16. The system of claim 1, wherein the determine whether the interior of the enclosed space is unsafe for the unattended animal includes:
   determining, based on the humidity data, whether the rate of decrease of humidity is above a humidity rate threshold; and
   determining that the interior of the enclosed space is unsafe based on the rate of decrease of humidity being above the humidity rate threshold.

17. A system for calibrating one or more electronic devices for determining whether unattended animals are in enclosed spaces, the system comprising a processor and a non-transitory computer readable medium storing machine readable instructions when execute facilitate performing the steps of:

receiving temperature data and humidity data from the one or more electronic devices, each of the one or more electronic devices for determining whether a respective one of the unattended animals is in a respective one of the enclosed spaces, the temperature data and the humidity data associated with interiors of each of the enclosed spaces;

training a machine learning algorithm to analyze the temperature data and the humidity data to determine a temperature threshold and a humidity rate threshold, the machine learning algorithm being configured to recognize that a decrease in humidity or a rate of decrease in humidity inside each of the enclosed spaces is an indication of a presence of an unattended animal therein, the temperature threshold and the humidity rate threshold being thresholds for a respective one of the one or more electronic devices to generate an alert when the respective one of the unattended animals is in the respective one of the enclosed spaces; and sending the temperature threshold and the humidity rate threshold to the one or more electronic devices.

18. The system of claim 17, wherein the one or more electronic devices are in a same geographical region, wherein the geographical region includes a state, a city, a county, a street, or any combination thereof.

19. A method for determining whether an unattended animal is left in an enclosed space, the method comprising:

generating temperature data and humidity data associated with an interior of the enclosed space;

generating physiological data associated with the unattended animal;

determining, based on the temperature data and the humidity data, whether the interior of the enclosed space is unsafe for the unattended animal, wherein a decrease in humidity or a rate of decrease in humidity indicates a presence of the unattended animal in the interior of the enclosed space;

determining, based on the physiological data and the humidity data, whether the unattended animal is within the interior of the enclosed space; and based on the interior of the enclosed space being unsafe for the unattended animal, starting a countdown timer when the physiological data indicates a presence of the unattended animal within the interior of the enclosed space.

20. A system for determining whether an unattended animal is left in an enclosed space, the system comprising:

a sensor provided within the enclosed space, the sensor configured to:
generate temperature data and humidity data associated with an interior of the enclosed space, and
generate physiological data associated with the unattended animal;

a memory storing machine-readable instructions; and a control system including one or more processors configured to execute the machine-readable instructions to:

determine, based on the temperature data and the humidity data indicating a decrease in humidity or a rate of change of humidity satisfying a criterion, whether the interior of the enclosed space is unsafe for the unattended animal by:

determining, based on the temperature data, whether separation between temperature inside the interior and heat index inside the interior is below a separation threshold, and determining that the interior of the enclosed space is unsafe based on the separation being above the separation threshold;

determine, based on the physiological data, whether the unattended animal is within the interior of the enclosed space; and based on the interior of the enclosed space being unsafe for the unattended animal, start a countdown timer when the physiological data indicates a presence of the unattended animal within the interior of the enclosed space.

* * * * *